United States Patent
Riviere et al.

(10) Patent No.: US 10,287,025 B2
(45) Date of Patent: May 14, 2019

(54) SYSTEM FOR SUSPENDING TWO MODULES OF A PROPULSION UNIT

(71) Applicant: SAFRAN AIRCRAFT ENGINES, Paris (FR)

(72) Inventors: Thomas Gerard Daniel Riviere, Moissy-Cramayel (FR); Antoine Elie Hellegouarch, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/764,867

(22) PCT Filed: Sep. 21, 2016

(86) PCT No.: PCT/FR2016/052387
§ 371 (c)(1),
(2) Date: Mar. 29, 2018

(87) PCT Pub. No.: WO2017/060581
PCT Pub. Date: Apr. 13, 2017

(65) Prior Publication Data
US 2018/0281980 A1    Oct. 4, 2018

(30) Foreign Application Priority Data
Oct. 5, 2015 (FR) ...................... 15 59451

(51) Int. Cl.
*B64D 27/26* (2006.01)
*B64D 35/04* (2006.01)
(Continued)

(52) U.S. Cl.
CPC ............. *B64D 27/26* (2013.01); *B64D 27/10* (2013.01); *B64D 35/04* (2013.01); *F02C 7/20* (2013.01);
(Continued)

(58) Field of Classification Search
CPC .. B64D 27/26; B64D 27/10; B64D 2027/266; B64D 2027/268; F02C 7/20
(Continued)

(56) References Cited

U.S. PATENT DOCUMENTS

| 4,717,094 A * | 1/1988 | Chee ...................... B64D 27/18 244/54 |
| 5,806,792 A * | 9/1998 | Brossier ................ B64D 27/18 244/54 |

(Continued)

FOREIGN PATENT DOCUMENTS

EP    1916406 A2    4/2008

OTHER PUBLICATIONS

International Search Report and Written Opinion received for PCT Patent Application No. PCT/FR2016/052387, dated Dec. 19, 2016, 15 pages (6 pages of English Translation and 9 pages of Original Document).

*Primary Examiner* — Muhammad Ijaz
(74) *Attorney, Agent, or Firm* — Womble Bond Dickinson (US) LLP

(57) ABSTRACT

The invention relates to a system for suspending two modules of a propulsion unit, such as two fan modules, said system comprising a pylon (28) and a rudder bar (30). One part (30') of the rudder bar is hinged to the pylon, while the opposing ends thereof are hinged to connecting rods (34, 36). The system also comprises a torque bar (40) which has an elongate shape and is mounted on the pylon such that it can pivot about an axis substantially parallel to an axis (B) of elongation of the torque bar, the opposing ends (42) of said bar being secured on each side of the above-mentioned part of the rudder bar.

9 Claims, 3 Drawing Sheets

(51) Int. Cl.
  *B64D 27/10* (2006.01)
  *F02C 7/20* (2006.01)
(52) U.S. Cl.
  CPC .. *B64D 2027/262* (2013.01); *B64D 2027/266* (2013.01); *B64D 2027/268* (2013.01)
(58) Field of Classification Search
  USPC .................................. 248/554, 555, 556, 557
  See application file for complete search history.

(56) References Cited

U.S. PATENT DOCUMENTS

| | | | |
|---|---|---|---|
| 6,296,203 B1 * | 10/2001 | Manteiga | B64D 27/18 244/54 |
| 6,325,327 B1 * | 12/2001 | Zoppitelli | B64C 27/001 244/17.27 |
| 6,330,995 B1 * | 12/2001 | Mangeiga | B64D 27/26 244/54 |
| 9,664,112 B2 * | 5/2017 | Balk | B64D 27/18 |
| 9,738,391 B2 * | 8/2017 | Mercier | F01D 25/285 |
| 9,889,943 B2 * | 2/2018 | Ewens | B64D 27/26 |
| 2005/0067528 A1 | 3/2005 | Loewenstein et al. | |
| 2010/0181417 A1 * | 7/2010 | Combes | B64D 27/26 244/54 |
| 2010/0181419 A1 * | 7/2010 | Haramburu | B64D 27/26 244/54 |
| 2012/0012694 A1 * | 1/2012 | West | B64D 27/26 244/54 |
| 2012/0056033 A1 * | 3/2012 | Teulou | B64D 27/26 244/54 |
| 2015/0274306 A1 | 10/2015 | Sheridan | |
| 2018/0281980 A1 * | 10/2018 | Riviere | B64D 27/10 |

* cited by examiner

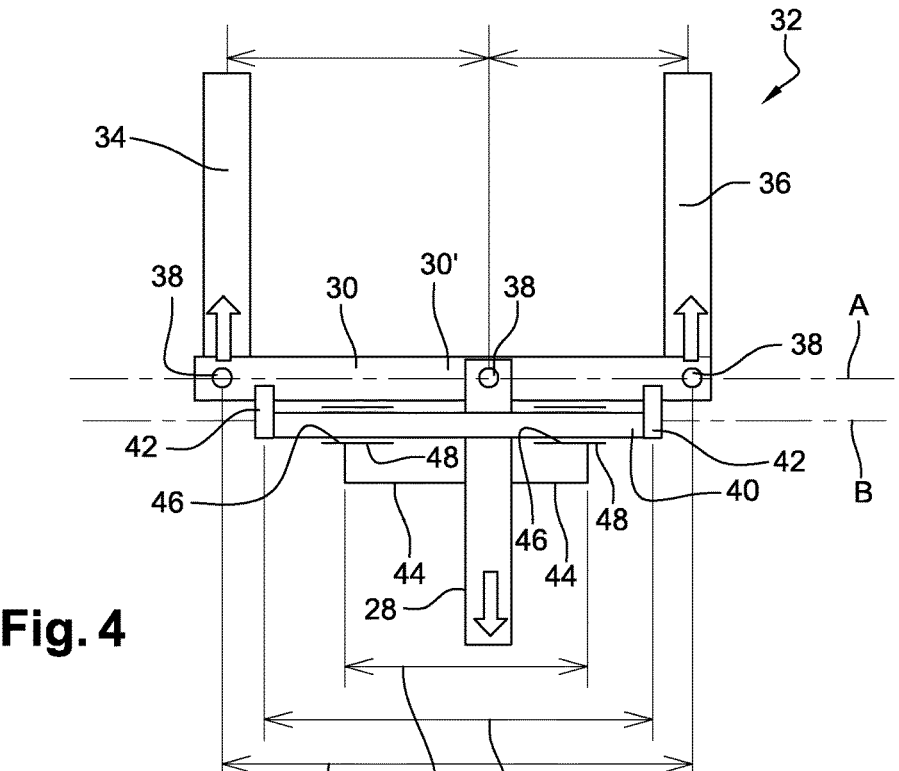
Fig. 4
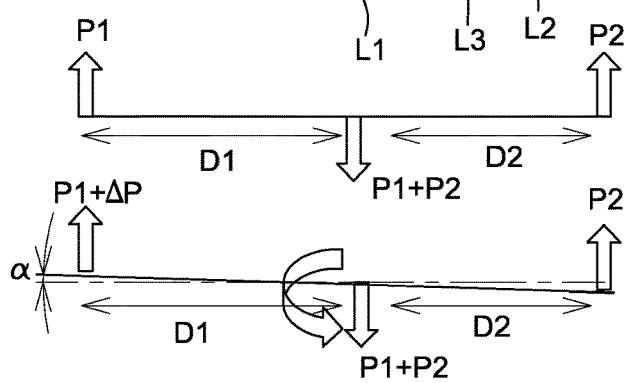
Fig. 5
Fig. 6
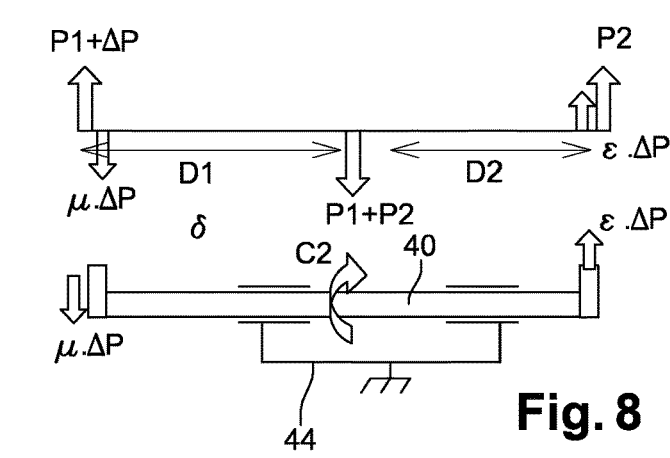
Fig. 8
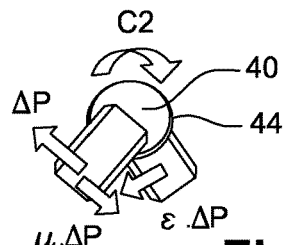
Fig. 7
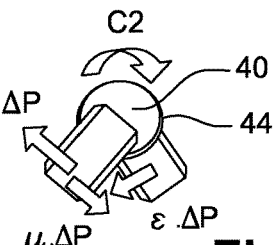
Fig. 9

SYSTEM FOR SUSPENDING TWO MODULES OF A PROPULSION UNIT

TECHNICAL FIELD

The present invention relates to a suspension system for two modules, such as two fan modules, of a propulsion unit, in particular of an aircraft.

PRIOR ART

The prior art notably comprises documents EP-A2-1 916 406, US-A1-2015/274306 and US-A1-2005/067528.

The applicant has undertaken work on a propulsion unit architecture with at least two distributed fans. The aim was to achieve optimization of the propulsive efficiency owing to a high by-pass ratio, while maintaining acceptable ground clearance and fans of reduced size.

A schematic diagram of said unit 10 is shown in FIG. 1. A gas generator 12 conventionally comprises one or more compressors supplying air to a combustion chamber. The gases leaving the chamber drive one or more turbines connected to the compressors, and in the present case a free turbine 14. The latter is integral with a power shaft 16 coaxial with the shaft of the gas generator 12. This power shaft 16 drives, via suitable bevel gears, two intermediate radial shafts 18 and 18' arranged transversely, in particular at right angles, to the axis of the gas generator. The intermediate radial shafts each drive an offset fan shaft 20, 20' generally parallel to the axis of the gas generator. Power transmission is effected by means of first gear trains 22 and 22' with bevel gears between the shaft 16 and the radial shafts 18 and 18' and second gear trains 24 and 24' with bevel gears between the radial shafts 18, 18' and the fan shafts 20 and 20'. The fan shafts 20 and 20' each drive a fan 26, 26' with axis parallel to that of the gas generator. Such an arrangement allows the aforementioned objects to be achieved.

It is known to suspend a propulsion unit on a structural element of an aircraft, by means of a pylon. For the particular architecture mentioned in the foregoing, the applicant chose to suspend the propulsion unit with two fans on a single pylon.

However, mounting two fan modules on a single pylon requires the two modules to generate the same thrust. In this configuration, the pylon is mounted mid-way between the modules, the plane of symmetry of the pylon being perpendicular to the plane containing the axes of the fans, and located equidistantly from these axes.

Now, in production, there is a potential deviation of a few percent on the thrust of two fan modules. Moreover, there are fan designs where the thrusts are different deliberately. In both of the aforementioned cases, two different thrusts generate a torque on the pylon, which requires the pylon to be overdimensioned so that it has sufficient fatigue strength and static strength. This has a significant effect on the weight of the pylon and therefore of the suspension system for the propulsion unit.

To solve this torque problem, it would be possible to position the pylon in the vertical plane passing through the centre of gravity of the propulsion unit (FIG. 2), provided that the centres of gravity of the propulsion units are positioned in such a way that the lever arms of each of the modules are inversely proportional to their thrust: $d \cdot P = d' \cdot P'$ where P and P' denote the respective thrusts of the modules, and d and d' are the respective distances of the centres of gravity of the fan modules 26, 26' from the pylon 28.

Another solution would be to position the pylon 28 in the vertical plane passing through the centre of gravity of the propulsion unit, and use an asymmetric crossbar 30 so that $L \cdot P = L' \cdot P'$ where P and P' denote the respective thrusts of the modules and L and L' are the distances from the axes of the modules 26, 26' to the pylon 28 (FIG. 3).

However, these two solutions are not entirely satisfactory as they are difficult to adapt to different configurations. If a module is changed, or there is variation in thrust or failure of a module, these solutions are incapable of limiting the displacements of the modules.

The present invention proposes a solution to the aforementioned need, which is simple, effective and economical.

SUMMARY OF THE INVENTION

The invention proposes a suspension system for two modules of a propulsion unit, such as two fan modules, comprising a pylon, a crossbar one part of which is hinged on said pylon and opposite ends are hinged on link rods, characterized in that it further comprises a torque reaction bar, said bar being of elongated shape and mounted swivelling on said pylon about an axis approximately parallel to an extension axis of said bar, opposite ends of said bar being fixed to said crossbar, on either side of said portion of the latter.

The torque reaction bar makes it possible to limit the relative displacements between the modules, simplify the integration of the propulsion unit (reduction in the size of the joints between the pods of the modules and between the pods and the pylon, reduction of the assembly clearances and of the main frame of the pods, etc.), and limit the stresses on the pods (potential increase in weight). The system according to the invention may be used for suspending two fan modules of a propulsion unit or other types of modules, such as two engines or gas generators, of a propulsion unit.

The system according to the invention may comprise one or more of the following features, taken separately from one another or in combination with one another:

- said crossbar is hinged by swivel joints to said pylon and to said link rods,
- said rotation axis of the bar is substantially coincident with the extension axis of the latter,
- said ends of the bar are fixed to said crossbar near said ends of the crossbar,
- said crossbar extends substantially parallel to the extension axis of said bar, or has an elongated shape whose extension axis is substantially parallel to the extension axis of said bar,
- said portion of the crossbar is a middle portion or is located mid-way from said ends of the crossbar,
- said portion of the crossbar is a portion located at a distance D1 from one of the ends of the crossbar and at a distance D2 from the other end of the crossbar, D1 being different from D2,
- said crossbar comprises two supporting arms of said bar that comprise holes for mounting said bar,
- a distance L1 between said ends of the crossbar is greater than a distance L2 between said ends of the bar, which is itself greater than a distance L3 between said arms of the crossbar, the distances being measured along said extension axis of the bar.

The present invention also relates to a propulsion unit, comprising a gas generator and at least two fan modules, characterized in that it is equipped with a system as described above, said link rods being hinged respectively on said fan modules.

DESCRIPTION OF THE FIGURES

The invention will be better understood and other details, features and advantages of the invention will become clearer on reading the following description provided as a non-limiting example and referring to the appended drawings, in which:

FIG. 4 is a very schematic view of a suspension system according to the invention;

FIGS. 5 to 8 are very schematic views similar to that in FIG. 4 and illustrate the operating principle of the system;

FIG. 9 is a very schematic side view of the system and illustrates the operating mode in FIG. 8.

DETAILED DESCRIPTION

FIG. 4 shows a non-limiting embodiment of the invention that relates to a system 32 for suspension of two modules of a propulsion unit that comprises at least one gas generator and at least one fan.

Figure 1:
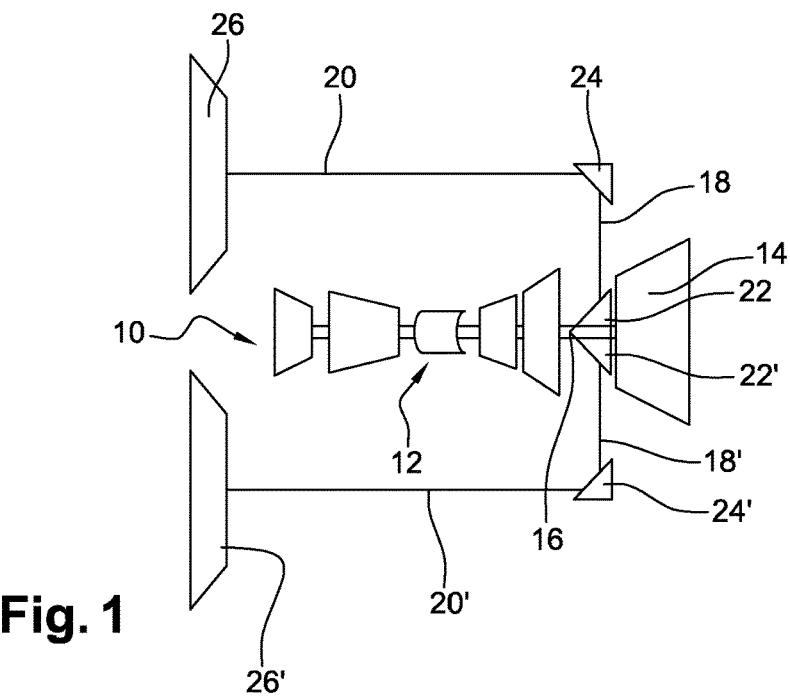
FIG. 1 is a very schematic view of a propulsion unit with two fan modules.
Figure 2:
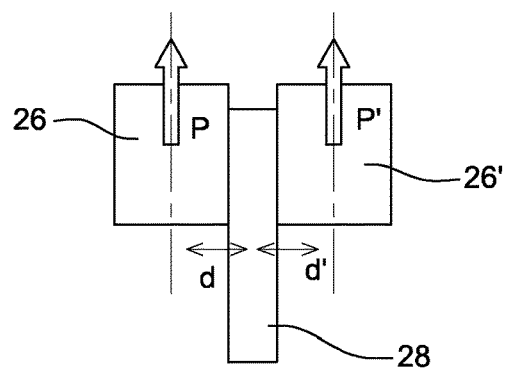
FIGS. 2 and 3 are very schematic views of systems for suspension of fan modules of a propulsion unit.
Figure 3:
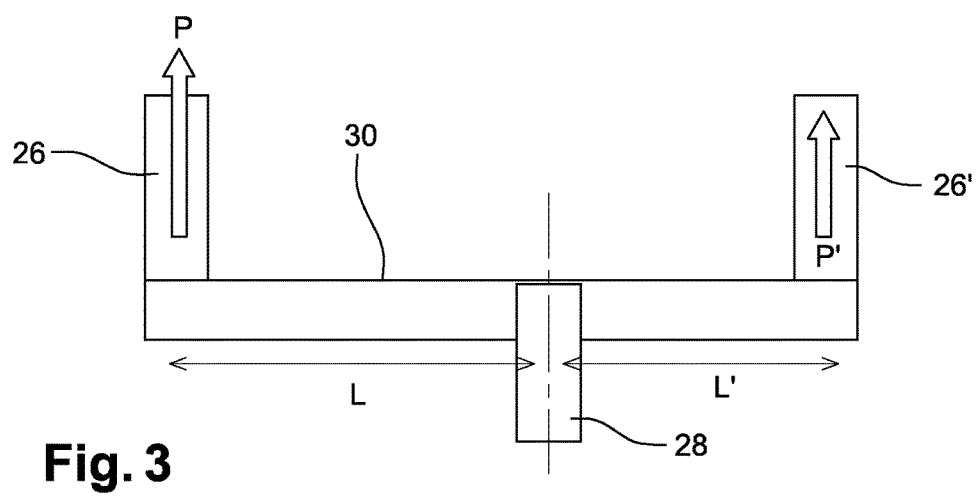

In the case when the propulsion unit comprises two fan modules, as shown in FIG. 1, the suspension system 32 may be used for suspending these two modules on an aircraft.

The system 32 essentially comprises a pylon 28, a crossbar 30, thrust-reacting link rods 34, 36, and a torque reaction bar 40.

The pylon 28 has an elongated shape and one of its longitudinal ends is in this case hinged on a portion 30' of the crossbar 30, which is either a middle portion of the crossbar or some other portion of the crossbar as is the case in the example shown. This portion 30' takes up the thrust forces of the two fan modules.

The crossbar 30 also has an elongated shape with an extension axis designated A. Each of its longitudinal ends is hinged on one end of at least one link rod 34, 36, whose opposite end is intended to be hinged on one of the fan modules.

The portion 30' of the crossbar 30 is located at a distance D1 from the end of the crossbar 30 connected to the link rod 34, and at a distance D2 from the opposite end of the crossbar 30 connected to the link rod 36. In the example shown, D1 is greater than D2. The means 38 for articulation of the pylon 28 to the crossbar 30 and of the crossbar to the link rods 34, 36 are preferably of the swivel type.

The torque reaction bar 40 has an elongated shape whose extension axis is designated B and is substantially parallel to the axis A.

Figure 10:
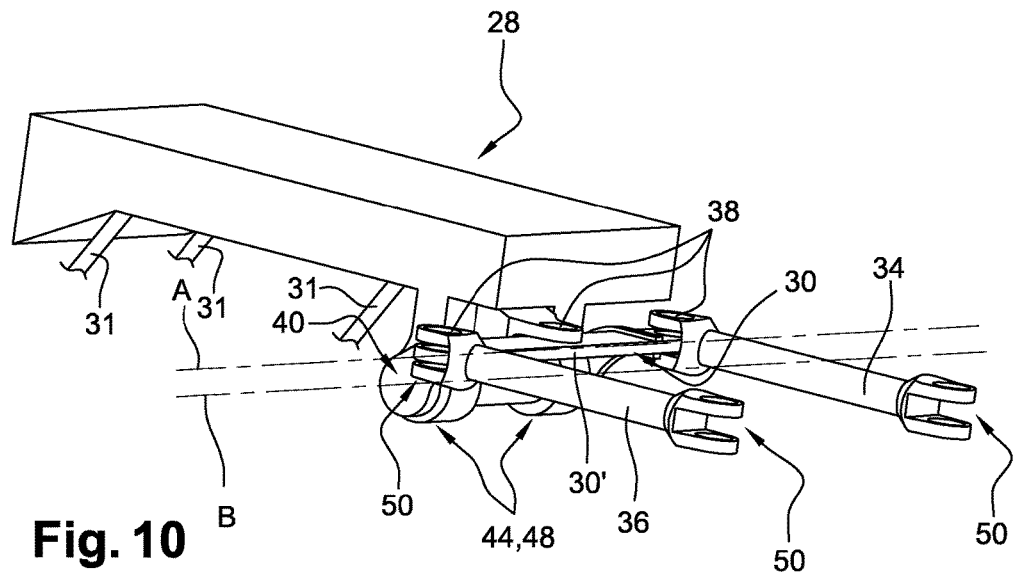
FIGS. 10 and 11 are schematic perspective views of one embodiment of the suspension system according to the invention.
Figure 11:
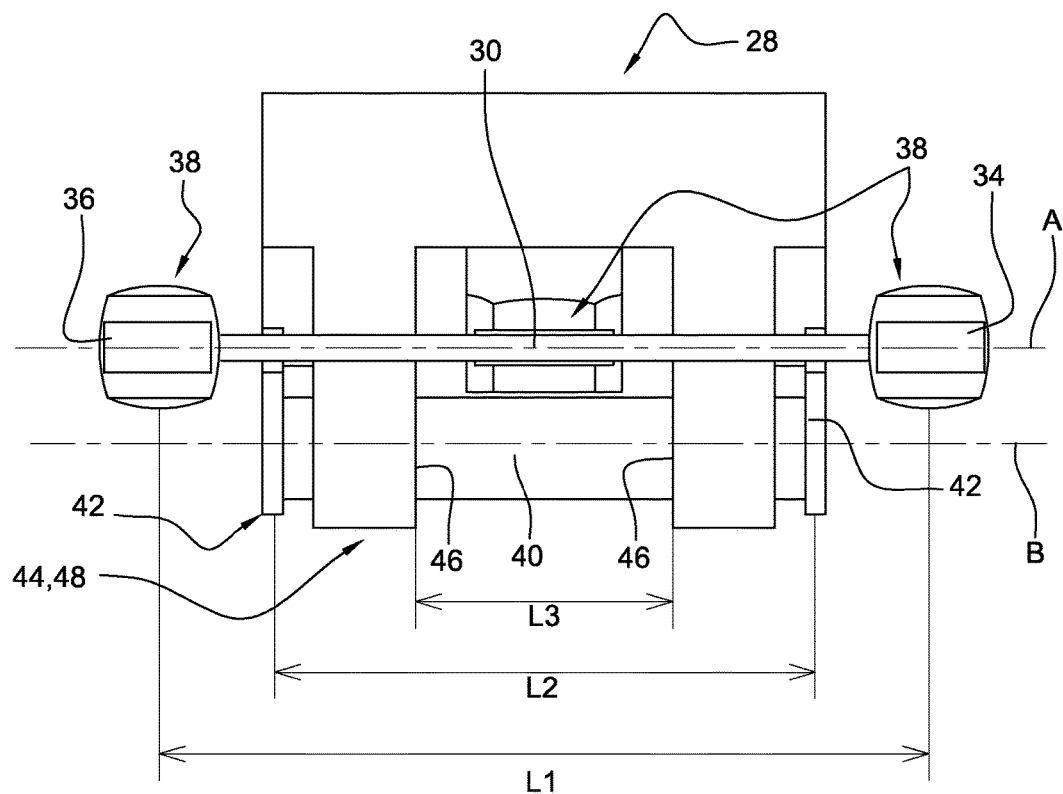

The bar 40 is fixed rigidly to the crossbar 30 and is mounted by a swivel joint on the pylon 28. The bar 40 extends in the vicinity of the crossbar 30 and here it has a length L2 less than that L1 of the crossbar 30. The longitudinal ends 42 of the bar 40 are fixed on the crossbar 30 on either side of the portion 30', and near the ends of the crossbar 30 in the example shown. Preferably, but in a non-limiting manner, the rigid link between the crossbar 30 and the bar 40 is made by means of a male-female joint. In particular, as is illustrated in FIGS. 10 and 11, each longitudinal end 42 of the bar 40 has a section of H shape or U shape, the two branches of which grip the body of the crossbar 30, here of rectangular section. Of course, the crossbar 30 could have a body of H-shaped or U-shaped section with two branches fitting round a fork provided on the longitudinal end 42. The male-female joint is of the surface bearing type.

The pylon 28 comprises two arms 44 for supporting and mounting the bar 40. Each arm 44 comprises a hole 46 for passage of the bar 40 and guidance in rotation about the axis B. In the case when the bar 40 is of a cylindrical shape, each arm 44 could comprise a tubular portion 48 defining a cylindrical internal surface for guiding the corresponding arm, as can be seen in the more concrete example in FIGS. 10 and 11. The pylon 28 supports the gas generator via the inlet housing and the exhaust housing of the latter by means of suspensions 31 arranged upstream and downstream of the pylon 28. The suspensions 31 comprise sets of link rods generally arranged respectively in planes transverse to the longitudinal direction of the pylon 28.

In the embodiment in FIGS. 10 and 11, each link rod 34, 36 is of an elongated shape and comprises an attachment fork 50 at each of its longitudinal ends. The link rods 34, 36 extend in a plane approximately containing the crossbar 30, and therefore parallel to the axes A and B. Each fork 50 comprises two lugs, between which the corresponding end of the crossbar 30 extends. The lugs of each fork 50, for example, carry a pin that passes through a bore in a swivel housed in a spherical housing of the corresponding end of the crossbar. The same type of swivel joint may be provided between the pylon 28 and the portion 30' of the crossbar 30. The pylon 28 may thus comprise a fork in which the portion 30' is inserted and mounted by a swivel joint.

Each link rod 34, 36 hinged on a fan module may be offset (not parallel) relative to the axis of the gas generator. The offset angle may be between 5 and 15°.

From now on reference will be made to FIGS. 5 to 9, which illustrate the operating principle of the system according to the invention.

FIG. 5 shows the system in equilibrium, i.e. when $P1 \cdot D1 = P2 \cdot D2$ with P1 and P2 denoting the respective thrusts of the fan modules to which the link rods 34, 36 are connected. Thus, there is minimum torsion in the bar 40. It should be noted that the relation $P1 \cdot D1 = P2 \cdot D2$ is optimum and desired. In fact, variations in the manufacture of the fan modules and the different operating conditions of the fans mean there is residual torsion, so that the result is of the order of +/−10%.

FIG. 6 illustrates the case when a perturbation ΔP occurs. In this case, a torque C1 is applied to the crossbar 30, which rotates about the pivot point (of the swivel joint of the crossbar 30 to the pylon 28) by an angle α on the pylon.

As is shown in FIGS. 7 to 9, the bar 40 makes it possible to limit the displacements by applying a torque C2 that opposes the displacements caused by torsion of the bar 40. The quantities μ·ΔP and p·ΔP represent the forces caused by the reaction of the bar 40 (opposing torque C2 equal to the induced torque C1).

For this purpose, the torque reaction bar 40 is made of high-alloy steel so as to take up the forces. Some other material additionally comprising properties of heat resistance may of course be used for making the bar 40.

A propulsion unit with fan modules with different thrust may thus be suspended without technical difficulty on a structural element of the aircraft.

The invention claimed is:

1. A suspension system for two modules of a propulsion unit, comprising:
   a pylon,
   a first and a second link rods,
   crossbar, said crossbar comprising a portion hinged on said pylon, said crossbar comprising first and second opposite ends, said first end being hinged on said first link rod and said second end being hinged on said second link rod,
   wherein it further comprises a torque reaction bar, said torque reaction bar being of elongated shape and being mounted swivelling on said pylon about an axis substantially parallel to an extension axis (B) of said torque reaction bar,
   said torque reaction bar comprising first and second opposite ends fixed to said crossbar, on either side of said portion of said crossbar.

2. The suspension system according to claim 1, wherein said crossbar is hinged by swivel joints to said pylon and to said first and a second link rods.

3. The suspension system according to claim 1, wherein said first and second opposite ends of the torque reaction bar are fixed to said crossbar near said first and second opposite ends of the crossbar.

4. The suspension system according to claim 1, wherein said crossbar extends substantially parallel to the extension axis (B) of said torque reaction bar, or has an elongated shape whose extension axis is substantially parallel to the extension axis of said torque reaction bar.

5. The suspension system according to claim 1, wherein said portion of the crossbar is a middle portion or is located mid-way from said first and second opposite ends of the crossbar.

6. The suspension system according to claim 1, wherein said portion of the crossbar is a portion located at a distance D1 from said first opposite ends of the crossbar and at a distance D2 from said second opposite end of the crossbar, D1 being different from D2.

7. The suspension system according to claim 1, wherein said crossbar comprises two supporting arms of said torque reaction bar that comprise holes for mounting said torque reaction bar.

8. The suspension system according to claim 6, wherein a distance L1 between said first and second opposite ends of the crossbar is greater than a distance L2 between said first and second ends of the torque reaction bar, which is itself greater than a distance L3 between said supporting arms of the crossbar, the distances being measured along said extension axis (B) of the torque reaction bar.

9. A propulsion unit, comprising:
   a gas generator,
   at least two fan modules,
   wherein it is equipped with a suspension system comprising:
      a pylon,
      first and second link rods,
      a crossbar, said crossbar comprising a portion hinged on said pylon, said crossbar comprising first and second opposite ends, said first end being hinged on said first link rod and said second end being hinged on said second link rod,
   wherein it further comprises a torque reaction bar, said torque reaction bar being of elongated shape and being mounted swivelling on said pylon about an axis substantially parallel to an extension axis of said torque reaction bar,
   said torque reaction bar comprising first and second opposite ends of said bar being fixed to said crossbar, on either side of said portion of said crossbar, and
   wherein said first and a second link rods are hinged respectively on said at least two fan modules.

* * * * *